3,061,612
THIOESTER PRODUCTION
William G. Toland, San Rafael, Calif., assignor to California Research Corporation, San Francisco, Calif., a corporation of Delaware
No Drawing. Filed Mar. 24, 1959, Ser. No. 801,460
3 Claims. (Cl. 260—330.5)

This invention relates to the production of certain thioester compounds, more particularly to the production of esters of primary mercaptans, and still more particularly to the production of: (1) thiolactones from certain carboxylic acid cyclic anhydrides, and (2) thioesters from certain acyclic carboxylic acid anhydrides, the ester radical being derived from one of the acid molecules from which the acyclic anhydride was formed.

Thioesters produced pursuant to the process of the present invention have utility in many applications, including the following:

(a) As plasticizers in those cases where they have relatively low volatility.
(b) As chemical intermediates in the preparation of foam improvers, polyesters, detergents, polyamides and resins.
(c) As chemical intermediates in the preparation, by hydrolysis of higher aliphatic thioesters, of primary mercaptans, which in turn have utility in the rubber accelerator field.
(d) As chemical intermediates in the preparation of other esters that are useful as plasticizers.

In accordance with the present invention there is provided a process for preparing a thioester which comprises reducing a carboxylic acid anhydride with hydrogen sulfide. The acid anhydride may have its carbonyl groups linked by oxygen, or it may be a thioanhydride with a sulfur linkage.

The process comprehends the reduction to thioesters of carboxylic acid anhydrides, including those of their substituted derivatives which do not materially affect the formation of the desired thioesters. For example, as set forth in more detail below, alkyl and chloro-substituents may be present. With the detailed guides presented herein, those skilled in the art will be able to recognize, or determine by routine experimentation, the extent, if any, to which any particular additional substituent on the charge acid or anhydride will affect the production of the desired thioesters.

More particularly, the process comprehends the reduction with hydrogen sulfide of any one or combination of the anhydrides in the following classes to produce at least one thioester, the thioesters produced being esters of primary mercaptans, and more particularly: (1) the thioester produced from a cyclic anhydride in classes 1 through 4 being a thiolactone, and (2) the thioester produced from an acyclic anhydride in classes 5 and 6 having its ester radical derived from one of the acid molecules from which the acyclic anhydride was formed.

*Class 1.*—The cyclic anhydrides of those mononuclear and polynuclear aromatic polycarboxylic acids, including substituted derivatives thereof, that can eliminate water under the influence of heat to form a cyclic anhydride.

Where a substituted derivative of an aromatic polycarboxylic acid cyclic anhydride is used, the substituent or substituents may be, for example, one or any possible combination of the following groups: alkyl, chloro, aryl, O-alkyl, S-alkyl, O-aryl, S-aryl, carboxyl, or fused or unfused cycloaliphatic, aromatic or heterocyclic rings, —SH, —OH.

Representative operative compounds include cyclic anhydrides of:

Orthophthalic acid
1,2,-naphthalene dicarboxylic acid
1,8-naphthalene dicarboxylic acid
1,2,3,4-tetrahydronaphthalene-6,7-dicarboxylic acid
Quinoline-6,7-dicarboxylic acid
Hemimellitic acid
Trimellitic acid
Benzene-1,2,3,4-tetracarboxylic acid
Benzene-1,2,3,5-tetracarboxylic acid
Pyromellitic acid
Mellitic acid It will be understood that it is within the scope of the present invention to supply the Class 1 acids themselves instead of their anhydrides to the reaction zone, because the acids will eliminate water under the conditions of the reaction to form the necessary cyclic anhydrides.

*Class 2.*—The thioanhydrides corresponding to the anhydrides in class 1.

*Class 3.*—The cyclic anhydrides of cyclic or acyclic aliphatic polycarboxylic acids, i.e., the anhydrides of those aliphatic polycarboxylic acids having more than four carbon atoms that can eliminate water under the influence of heat to form a cyclic anhydride.

The acid may be either straight-chain or branched-chain. Where the acid has at least one added substituent, the substituent may be any one or possible combination of the following groups: alkyl, chloro, aryl, O-alkyl, S-alkyl, O-aryl, S-aryl, carboxyl, —SH, —OH.

Representative operative compounds include cyclic anhydrides of:

Maleic acid
Succinic acid
Glutaric acid
Adipic acid
Citraconic acid
Itaconic acid
Cyclohexanedicarboxylic acid
Substituted derivatives of the foregoing It will be understood that it is within the scope of the present invention to supply the class 3 acids themselves instead of their anhydrides to the reaction zone, in those cases in which the acids will eliminate water under the conditions of the reaction to form the necessary cyclic anhydrides.

*Class 4.*—The thioanhydrides corresponding to the acids in class 3.

*Class 5.*—The anhydrides of cyclic or acyclic aliphatic or aromatic monobasic carboxylic acids.

The acid may be either straight-chain or branched-chain. Where the acid has at least one added substituent, the substituent may be selected from the following groups: chloro, aryl, O-alkyl, S-alkyl, O-aryl, S-aryl, —SH, —OH.

Representative operable compounds include anhydrides of the following acids:

Acetic acid
Propionic acid
Butyric acid
Valeric acid
Caproic acid
Enanthic acid
Caprylic acid
Pelargonic acid
Capric acid
Pentadecanoic acid
Arachidic acid
Pentacosanoic acid
Benzoic acid
Toluic acid
Cyclohexane monocarboxylic acid
Substituted derivatives of the foregoing

*Class 6.*—The thioanhydrides corresponding to the anhydrides in class 5.

The process is conducted at temperatures of about from 300° to 700° F., preferably about from 350° to 650° F., and at pressures, preferably autogenous, about from 100 to 5000 p.s.i.g., preferably about from 500 to 2500 p.s.i.g.

The hydrogen sulfide reducing agent may be supplied alone as such to the process, or in combination with other materials that will result in the production of additional hydrogen sulfide under reaction conditions, or the entire requirements of hydrogen sulfide may be obtained from the use of such other materials only. Any combination of hydrogen sulfide, sulfur and hydrogen that will provide the desired amount of hydrogen sulfide may be used. Hydrogen as such may be supplied to the process to produce hydrogen sulfide by combination with sulfur produced during the reaction, which will aid in driving the reaction further to completion, as well as by combination with sulfur as such supplied to the process.

At least sufficient hydrogen sulfide must be used to produce a thioester product under reaction conditions; however, the amount used is not otherwise critical. Those skilled in the art will recognize the minimum amounts of hydrogen sulfide, including that produced during the reaction, that will be necessary to accomplish complete reduction. For example, 3 moles of hydrogen sulfide will be necessary to reduce one mole of phthalic anhydride to one mole of thiophthalide. Less will be required when starting with a thioanhydride than when starting with an anhydride not containing a sulfur atom. Less will be required if only incomplete reduction is desired. An excess over the amount necessary also may be used, and is preferable. At least a fifty percent excess is particularly desirable; however, although gas recycle operation may be used in continuous processes, the upper limit on the amount of hydrogen sulfide used may become dictated as a practical matter by permissible recycle rates. There appears to be little, if any, advantage in using more than about a 10 to 1 molar ratio between the hydrogen sulfide and the organic compound to be reduced.

Accordingly, for various combinations of hydrogen, sulfur, hydrogen sulfide and carboxylic acid anhydride supplied to the process, the following are preferred mole ratio ranges, each followed by the most preferred ratio within the range:

(a) $\dfrac{\text{mols anhydride}}{\text{mols H}_2\text{S}} = \dfrac{1}{3} \text{ to } \dfrac{1}{10}; \dfrac{1}{4.5}$ (b) $\dfrac{\text{mols anhydride}}{\dfrac{\text{mols H}_2\text{S}}{1} \dfrac{\text{mols H}_2}{2}} = \dfrac{1}{1} \text{ to } \dfrac{1}{5}; \dfrac{1}{1.5}$
$\phantom{xxxxxxxxxxx} \dfrac{1}{2} \phantom{xxxxx} \dfrac{1}{10} \phantom{x} \dfrac{1}{3}$ (c) $\dfrac{\text{mols anhydride}}{\dfrac{\text{mols S}}{1} \dfrac{\text{mols H}_2}{3}} = \dfrac{1}{1} \text{ to } \dfrac{1}{5}; \dfrac{1}{1.5}$
$\phantom{xxxxxxxxxxx} \dfrac{1}{3} \phantom{xxxxx} \dfrac{1}{15} \phantom{x} \dfrac{1}{4.5}$ Solvents, for example benzene or naphthalene, that are inert under the conditions of the reaction may be employed, but are unnecessary. In the case of phthalic anhydride and other polycarboxylic acid anhydrides, the solvent, if used, may even be water, because the tendency for these compounds to maintain stable cyclic structures is sufficiently great that the amount of anhydride available for reduction is not unduly decreased. However, in other cases where the anhydride is stable in water but the equilibrium between acid and water is strongly in favor of the acid, the solvent, if used, should not be water. It should be remembered when using a water solvent that the situation can be aggravated by the presence of water formed as a product of the reaction. Of course water should not be used in connection with those anhydrides, for example succinic and acetic anhydride, that are unstable in water.

The vigor and completeness of the reduction reaction increases with temperature and the completion of the reduction of the organic charge tends to increase with reaction time. The extent of the reduction is controllable by varying time, temperature, pressure, and ratio of reactants.

The reduction may be accomplished batchwise or in a continuous process.

When batch operation is employed, the organic compound to be reduced and the reducing agent may be introduced into an autoclave which may be sealed and heated to reaction temperature with shaking to facilitate contact of the reactants. The size of the autoclave may be so related to the quantity of the materials introduced therein that upon heating to reaction temperature the desired pressure is built up autogenously. After the reactants have been held at reaction temperature for a time sufficient to effect the desired degree of reduction of the organic compound, the autoclave may be cooled under pressure to produce a cooled reaction mixture containing the desired thioester product, which may then be separated from the cooled reaction mixture by conventional methods.

When a continuous process is employed, an elongated tubular reaction zone is desirable. The reactants may be passed continuously through the reaction zone at reaction temperature and pressure to produce a reaction mixture, which may be continuously cooled under the desired pressure to produce a cooled reaction mixture containing the desired thioester product, from which said product may be removed by conventional means.

The runs in the following Tables I and II will serve to further illustrate the applicability of the process of the present invention in the production of thioesters.

All of the runs were conducted in a 4.5 liter autoclave. After addition of the reagents to the autoclave, it was heated to the desired temperature while being shaken. At the end of the desired reaction time the autoclave was allowed to cool to ambient temperature. The gaseous products were bled through a caustic scrubber to absorb $H_2S$, through a Dry Ice trap to condense any neutral volatile materials such as hydrocarbons, and through a wet test meter to measure hydrogen. The liquid and solid products were then worked up in a conventional manner.

Table I

| Run No. | 1 | 2 | 3 | 4 | 5 | 6 | 7 |
|---|---|---|---|---|---|---|---|
| Charge: | | | | | | | |
| Phthalic anhydride: | | | | | | | |
| G. | 600 | 600 | 148 | 148 | 300 | 300 | 300 |
| Mols. | 4.0 | 4.0 | 1.0 | 1.0 | 2.03 | 2.03 | 2.03 |
| $H_2S$: | | | | | | | |
| G. | 147 | 278 | 340 | 200 | 340 | 0 | 102 |
| Mols. | 4.32 | 8.18 | 10 | 5.9 | 10 | 0 | 3.0 |
| Hydrogen: | | | | | | | |
| P.s.i.g. | 0 | 0 | 0 | (1) | 0 | 1,000 | 1,200 |
| Mols. | 0 | 0 | 0 | (1.0) | 0 | 7.9 | 7.9 |
| Water: | | | | | | | |
| Cc. | 1,800 | 1,800 | 1,800 | 1,800 | 0 | 1,800 | 1,800 |
| Mols. | 100 | 100 | 100 | 100 | 0 | 100 | 100 |
| Conditions: | | | | | | | |
| Temp. (° F.) | 350 | 400 | 550–600 | 625 | 500 | 500 | 500 |
| Pressure at T.: | | | | | | | |
| Initial, p.s.i.g. | | 825 | 2,100 | | 1,200 | 2,300 | 2,450 |
| Final, p.s.i.g. | | 600 | 2,725 | 2,575 | 1,125 | 2,375 | 1,725 |
| Time at T., min. | 120 | 120 | 50 | 60 | 60 | 120 | 145 |
| Products: | | | | | | | |
| $H_2S$: | | | | | | | |
| G. | 59 | 56 | 231.7 | 140.3 | 151 | 0 | 48 |
| Mols. | 1.7 | 1.65 | 6.82 | 4.13 | 4.44 | 0 | 1.41 |
| Sulfur: | | | | | | | |
| G. | 39.9 | 109.4 | 37.3 | 46.6 | 142 | 0 | 0 |
| Mols. | 1.25 | 3.2 | 1.165 | 1.45 | 4.44 | 0 | 0 |
| Hydrogen, mols. | | | | | | 7.9 | |
| Thiophthalide: | | | | | | | |
| G. | 67.9 | 251.4 | 103.7 | 53.0 | 285.3 | | 160.7 |
| Mols. | 0.452 | 1.68 | 0.692 | 0.353 | 1.91 | | 1.07 |
| Conversion and yield, mol percent: | | | | | | | |
| Conversion on phthalic | 12.0 | 47.2 | 95.8 | 74.9 | 100 | 19.7 | 70.8 |
| Yield of thiophthalide on phthalic | 94.2 | 90.3 | 72.2 | 47.2 | 94.1 | 0.0 | 74.3 |

[1] Sulfur 32 g.

The following observations are of interest in connection with the various runs in Table I:

| Run No. | Observation |
|---|---|
| 1–4 | $H_2S$ alone as the reducing agent gave good yields of thiophthalide over a wide temperature range, in the presence of a water solvent. |
| 5 | A solvent was unnecessary. |
| 6 | No reduction occurred using $H_2$, but no $H_2S$. |
| 7 | $H_2S$ plus $H_2$ resulted in greater yields than theoretically obtainable with $H_2S$ alone. |

The following observations are of interest in connection with the various runs in Table II:

| Run No. | Observation |
|---|---|
| 8 | Pyromellitic acid dihydrate was reduced with $H_2S$ in a water solvent. |
| 9 | Succinic acid was not reduced with $H_2S$ in a water solvent; any anhydride formed at reaction temperature was unstable in water. |
| 10 | Succinic anhydride was reduced with $H_2S$ in the absence of a water solvent. |
| 11 | Acetic anhydride was reduced with $H_2S$. |
| 12 | Benzoic anhydride was reduced with $H_2S$. |

Table II

| Run No. | 8 | 9 | 10 | 11 | 12 |
|---|---|---|---|---|---|
| Charge: | | | | | |
| Organic feed, kind | Pyromellitic acid dihydrate | Succinic acid | Succinic anhydride | Acetic anhydride | Benzoic anhydride |
| G. | 254 | 236 | 200 | 510 | 56.5 |
| Mols. | 1.0 | 2.0 | 2.0 | 5.0 | 0.25 |
| $H_2S$: | | | | | |
| G. | 340 | 340 | 340 | 510 | 34.0 |
| Mols. | 10 | 10 | 10 | 15 | 1.0 |
| $H_2O$: | | | | | |
| G. | 900 | 1,800 | 0 | 0 | 0 |
| Mols. | 50 | 100 | 0 | 0 | 0 |
| Conditions: | | | | | |
| Temp., ° F. | 310–370 | 500 | 500 | 500 | 380 |
| Pressure at T.: | | | | | |
| Initial, p.s.i.g. | 1,025 | 2,050 | 1,100 | 1,525 | 1,500 |
| Final, p.s.i.g. | 1,000 | 2,025 | 1,050 | 1,550 | 2,225 |
| Time at T., min. | 130 | 60 | 60 | 120 | 120 |
| Products: | | | | | |
| $H_2S$: | | | | | |
| G. | 139 | 340 | 262 | 247.4 | 29.0 |
| Mols. | 4.34 | 10 | 7.7 | 7.28 | 0.85 |
| Sulfur: | | | | | |
| G. | | 0 | ±101.6 | 0 | 3.2 |
| Mols. | | 0 | | 1.86 | 0.1 |
| Recovered acid, g. | | 230+ | 101.4 | 510 | 37.3 |
| Thioester, kind | 4,5-dicarboxy thiophthalide | | Thiolane-2-one | Ethyl thioacetate | Benzyl thiobenzoate |
| G. | 25.0 | 2.0 | 15.9 | 42.5 | 11.9 |
| Mols. | 0.11 | | 0.156 | 0.41 | 0.052 |
| Conversion and yield, mol percent: | | | | | |
| Conversion on feed | | 0.0 | 57.0 | 15 | 92.0 |
| Yield of thioester | 11.0 | 0.0 | 13.7 | 54.7 | 22.6 |

Further in connection with Table II, the thioester produced in run 8 was 4,5-dicarboxy thiophthalide, with a neutral equivalent of 118.8 (theory=119). The presence of the carboxyl groups, the carbonyl group other than those in the carboxyl groups, and the —C—S—C— linkage all were identified by infra-red spectra. The structure is:

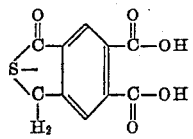

From the foregoing it may be seen that the process of the present invention provides a novel and practical route to the production of useful thioester products by the reduction of various acid anhydrides with hydrogen sulfide.

What is claimed is:
1. 4,5-dicarboxy thiophthalide.
2. The process of preparing a primary thioester which comprises producing a reaction mixture by reacting hydrogen sulfide at about 300 to 700° F. and a pressure from 100 to 5,000 p.s.i.g. with an acid anhydride selected from the group consisting of

(a) Anhydrides of saturated aliphatic monocarboxylic acids of 2 to 15 carbon atoms per molecule,
(b) Cyclic anhydrides of aliphatic dicarboxylic acids of 4 to 6 carbon atoms per molecule,
(c) Anhydrides of mononuclear aryl carboxylic acids of 1 to 6 carboxyl groups per molecule, and
(d) Anhydrides of cyclohexane carboxylic acids of 1 to 2 carboxyl groups per molecule;

and separating from said reaction mixture a product comprising said thioester.

3. The process as in claim 2, wherein hydrogen is added to the feed to combine with sulfur produced during the reaction to produce additional quantities of hydrogen sulfide.

References Cited in the file of this patent
FOREIGN PATENTS
800,412    Germany _____ Nov. 6, 1950

OTHER REFERENCES
Borgeson et al.: Journal American Chemical Society, vol. 51 (1929), pp. 1453–1456.
Whitmore: Organic Chemistry, 2nd ed., D. Van Nostrand Co., Inc., 1951, page 415.
Royals: Advanced Organic Chemistry, Prentice-Hall, Inc., 1956, pages 638 and 39.